May 15, 1962     A. C. DENISOFF     3,034,318
REFRIGERATION APPARATUS
Filed Feb. 16, 1960
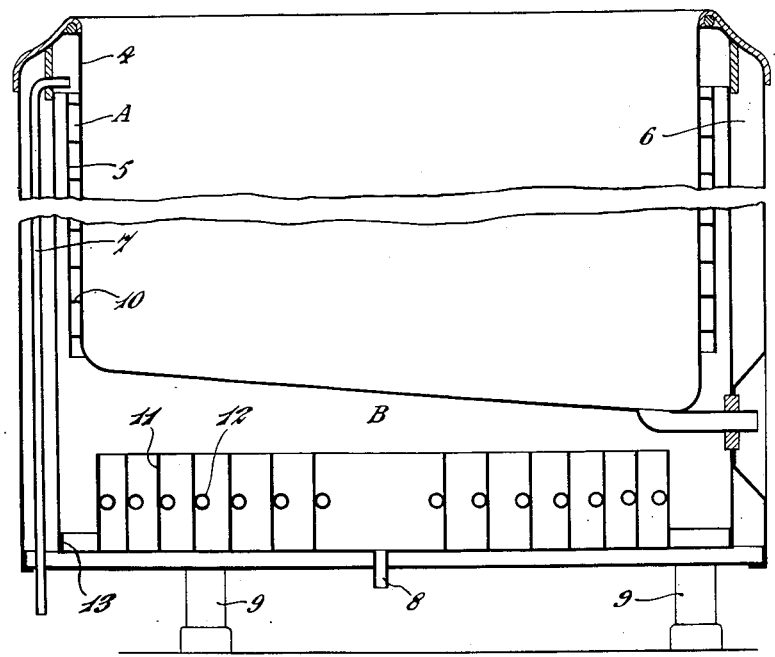
INVENTOR
Alexander C. Denisoff
By
Watson, Cole, Grindle & Watson
ATTORNEYS

United States Patent Office 3,034,318
Patented May 15, 1962

3,034,318
REFRIGERATION APPARATUS
Alexander Constantine Denisoff, 28B St. George's Road,
East Twickenham, England
Filed Feb. 16, 1960, Ser. No. 8,977
9 Claims. (Cl. 62—435)

This invention is concerned with ice-bank apparatus in which cold energy stored in the ice-bank formed in a sump of the water-cooled tank is made available as chilled water for intermittent circulation through a cooling device—for example, the chilled water can be used to cool a tank.

The fundamental technical problem involved in this type of apparatus is to melt the ice-bank, by the water returned from the cooling device, as uniformly and rapidly as possible so that the water after passing over the ice-bank will have its temperature reduced to that near the melting point of ice. The very fact that the water temperature becomes lower by passing over the ice-bank, causes the ice-bank to melt faster at the entrance and slower at the outlet of the apparatus, and this leads to operational difficulties due to accumulation of ice at the outlet.

The problem is particularly difficult in water-cooled tanks designed for cooling a comparatively large quantity of milk to a temperature only a few degrees higher than the melting point of ice, and in a short period of time. The ice-bank apparatus of such tanks is usually subject to dimensional limitations which require an ice-bank of such a compact size that it has to be practically one solid block of ice, comparatively long and wide but small in height. Under these conditions, the circulating water forms channels through the ice block in a haphazard manner, and large parts of the ice block may remain unmelted even when the water temperature at the outlet rises well above the melting point of ice.

Furthermore, when the ice building process is resumed, the unmelted parts of the ice block may produce such an uneven ice formation that the water circulation becomes erratic or even completely interrupted by ice blockage.

The principal object of the present invention is to provide compact ice-bank apparatus, in particular for water-cooled tanks, with an improved ice melting process which ensures uniform and rapid melting of the whole ice-bank, without the danger of blockage by ice and consequent interruption of water circulation, and thus overcomes the fundamental difficulties referred to.

The invention accordingly provides an open-topped generally horizontal spiral channel in the sump for circulating water, and a conduit for refrigerant for forming ice inside the channel.

One of the main advantages of a spiral channel, apart from its simplicity of construction, consists in automatically providing increasing turbulence in the water as it flows from the periphery to the center of the spiral, on account of the more rapid change of flow direction as the water approaches the center of the spiral with the result that the decreasing rate of ice melting due to the decreasing water temperature along the channel is compensated by the increasing turbulence, and this compensating process ensures an uniform rate of ice melting along the whole length of the channel.

Another important advantage of the spiral channel consists in greatly improved performance of the apparatus, in particular when the ice-bank is nearly all melted, to reduce the water temperature to the melting point of ice, through greatly improved rate of ice melting for a given rate of water flow, combined with a long length of the channel. In fact, since the circulating water is directed into a defined channel, whose width is many times smaller than that of the sump, the velocity of water flow is maintained at a required high value even when the whole ice-bank is nearly melted, and this is the critical stage in the cooling process when the product to be cooled by the cooling device approaches its lowest temperature and requires the cooling-water temperature to be as near to the melting point of ice as possible. This latter essential requirement is further ensured by the length of spiral channel being many times larger than that of the sump, but which does not produce excessive resistance to a comparatively large water flow, because a spiral channel has no return bends which greatly restrict the water circulation.

Still another important advantage of an open-topped generally horizontal spiral channel consists in the fact that when the initial amount of water in the sump is correctly adjusted and a sufficient space is provided in the center of the spiral, all the water in the channel can safely be converted into ice without the danger of interrupting the water circulation. In fact, if the resistance to a given rate of water flow through the channel becomes excessive on account of the channel space being almost fully occupied by ice, the water level at the center of the spiral will automatically recede whereas that at the periphery will increase, so that the water can then temporarily flow over the channel walls in radial directions towards the outlet in the center of the spiral.

These features of the spiral channel are also of practical importance in connection with thermostatic control of the ice-bank size, which as a rule is not free from troubles. Since the ice melting is quite uniform along the whole length of the spiral channel, and the performance is not affected when all the water in the channel is converted into ice, a reliable ice-bank control can easily be obtained by means of a simple thermostat, and its sensitive bulb can be fixed at any convenient place along the spiral channel. The function of the thermostatic control is thus reduced from accurately controlling the amount of ice in the sump to simply switching off the compressor when all the water in the spiral channel is converted into ice.

One practical form of apparatus according to the invention will now be described by way of example, with reference to the accompanying drawing, the sole FIGURE of which is a sectional elevation of a refrigerated tank.

Referring to the drawing, a cylindrical pan 4 made of thin stainless steel sheet is surrounded by a coaxial cylindrical jacket 5 of thin copper sheet. A helical passageway A is formed between the pan 4 and the jacket 5 by means of a helically wound dividing strip 10 with its opposite edges secured to the pan and jacket.

The pan 4 and the jacket 5 are supported from and surrounded by a double walled and thermally lagged casing 6, and the inlet pipe 7 of a water pumping system extends through the casing 6 with its outlet above the upper end of the helical passageway A so that a stream of water can be circulated therethrough. After passing through the helical passageway A the water falls into a sump B between the underside of the pan 4 and the base of the casing 6, and passes through an evaporator; the water is then drained from the sump through an outlet pipe 8 provided in the casing, and this water, cooled by its passage through the evaporator, is recirculated through the inlet pipe 7 by means of a circulating pump (not shown).

The evaporator takes the form of an upstanding metal strip 11 which is wound in a spiral manner and has soldered or otherwise secured thereto a pipe 12 within which a refrigerant is circulated, the lower edge of the spiral being secured to the base of a tray 13 located in the bottom of the casing 6. The outermost turns of the spiral strip 11 are adapted to collect the water falling into the sump B from the lower end of the helical passageway A whereby the water is caused to flow under gravity towards the centre of the spiral and thence through the outlet 8 in the centre of the tray, the water being effectively cooled during its passage through the spiral channel.

In operation refrigerant is continuously circulated through the evaporator pipe 12, and forms an ice bank in the channel provided by the strip 11 when the water-circulating pump is switched off. The ice forms from the water in which the evaporator is almost fully immersed and builds up against either side of the strip 11, so creating an ice-covered passage for water circulation. When warm liquid is placed in the pan and the water-circulating pump is switched on the ice can be melted at a high rate by the water circulating in the channel on its way to the outlet 8. The ice bank enables a higher rate of heat extraction from the warm pan than the refrigerant circulation alone could achieve, and allows a smaller refrigerator apparatus to be used for a given rate of heat extraction from the pan. When the pan and its contents are cooled down to the desired temperature and the water-circulating pump is again switched off, the ice builds up again to be ready for the next addition of warm liquid to the pan.

I claim:

1. Refrigeration apparatus to cool water by circulating said water over an ice bank, comprising a sump, means in said sump providing for said water a spiral generally horizontal channel which is open-topped over its length and through which said water flows under gravity, and an outlet from the sump at the end of the channel opposite that at which the water enters the channel, said apparatus including an evaporator conduit for refrigerant disposed in said channel to form said ice bank.

2. Apparatus as claimed in claim 1, wherein the outer turns of the spiral are disposed to collect said water, and the outlet is located centrally of the spiral.

3. Apparatus as claimed in claim 1, wherein the spiral is formed by securing strip metal to a base plate, the strip metal upstanding therefrom.

4. Apparatus as claimed in claim 1, wherein the spiral channel is formed by a single metal strip.

5. Apparatus as claimed in claim 3, wherein the conduit for refrigerant is a pipe which is secured to said strip metal.

6. Apparatus as claimed in claim 1, wherein the conduit for refrigerant follows the same course through the channel as the water.

7. Apparatus as claimed in claim 3, wherein the conduit for refrigerant is a pipe which is soldered to said strip metal, and the pipe forms a single run through the channel.

8. Refrigeration apparatus comprising a tank; a metal pan within the tank, a cooling unit situated within the tank and embracing said pan, said cooling unit causing a flow of chilled water against the walls of the pan; means to chill said water by circulating said water over an ice bank comprising a sump, means in said sump providing a spiral generally horizontal channel which is open-topped over its length, which is positioned to receive said water at one end thereof from the cooling unit and through which the water flows under gravity, a water outlet from the sump at the other end of said channel, an evaporator conduit for refrigerant disposed in said channel to form said ice bank therein, and means to recirculate water which leaves said outlet through the cooling unit.

9. Apparatus as claimed in claim 8, wherein said channel has at least one outer convolution under the walls of said pan so as to receive water flowing thereagainst, the outlet being located centrally of the spiral.

References Cited in the file of this patent

UNITED STATES PATENTS 2,840,996     Steinhorst et al.     July 1, 1958

FOREIGN PATENTS 6,422     Australia     Mar. 5, 1932